United States Patent
Weichselgartner et al.

(10) Patent No.: US 12,091,301 B2
(45) Date of Patent: Sep. 17, 2024

(54) METHOD FOR CALIBRATING COORDINATE SYSTEMS IN INDUSTRIAL TRUCKS

(71) Applicant: Jungheinrich Aktiengesellschaft, Hamburg (DE)

(72) Inventors: Felix Weichselgartner, Tiefenbach (DE); Hannes Moritz, Landshut (DE); Martin Schwaiger, Farchant (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 358 days.

(21) Appl. No.: 17/685,204

(22) Filed: Mar. 2, 2022

(65) Prior Publication Data

US 2022/0281726 A1    Sep. 8, 2022

(30) Foreign Application Priority Data

Mar. 2, 2021    (DE) ............... 10 2021 104 920.2

(51) Int. Cl.
*B66F 9/075* (2006.01)
*B66F 9/06* (2006.01)
*G05D 1/00* (2024.01)

(52) U.S. Cl.
CPC ............ *B66F 9/0755* (2013.01); *B66F 9/063* (2013.01); *G05D 1/0246* (2013.01)

(58) Field of Classification Search
None
See application file for complete search history.

(56) References Cited

U.S. PATENT DOCUMENTS

| | | | | |
|---|---|---|---|---|
| 4,278,142 A * | 7/1981 | Kono | .................. | G05D 1/0234 701/28 |
| 4,500,970 A * | 2/1985 | Daemmer | ............ | G05D 1/0255 701/25 |
| 4,866,617 A * | 9/1989 | Matsuda | ............. | G05D 1/0246 701/25 |
| 5,154,248 A * | 10/1992 | Schwager | ............ | G05D 1/0255 318/587 |
| 5,219,036 A * | 6/1993 | Schwager | ............ | G05D 1/0255 318/587 |
| 10,723,281 B1 * | 7/2020 | Briggs | .................. | G01S 17/931 |
| 2019/0311165 A1 | 10/2019 | Seitz et al. | | |
| 2021/0157112 A1 | 5/2021 | Raab et al. | | |

FOREIGN PATENT DOCUMENTS

| | | |
|---|---|---|
| DE | 102018108042 A1 | 10/2019 |
| DE | 102018115620 A1 | 1/2020 |
| DE | 102019204661 A1 | 10/2020 |
| DE | 102019131646 A1 | 5/2021 |
| DE | 102020105215 A1 | 9/2021 |

OTHER PUBLICATIONS

German Application No. 10 2021 104 920.2 , "Search Report", Oct. 27, 2021, 5 pages.

* cited by examiner

*Primary Examiner* — Lina Cordero
(74) *Attorney, Agent, or Firm* — Kilpatrick Townsend & Stockton LLP

(57) ABSTRACT

The present invention relates to a method for calibrating a coordinate system of an automated industrial truck, to a method for calibrating a coordinate system of a fleet of automated industrial trucks of the same vehicle type having uncalibrated coordinate systems, and to a system for carrying out one of these methods.

19 Claims, 2 Drawing Sheets

METHOD FOR CALIBRATING COORDINATE SYSTEMS IN INDUSTRIAL TRUCKS

CROSS REFERENCE TO RELATED APPLICATION

Figure 1:
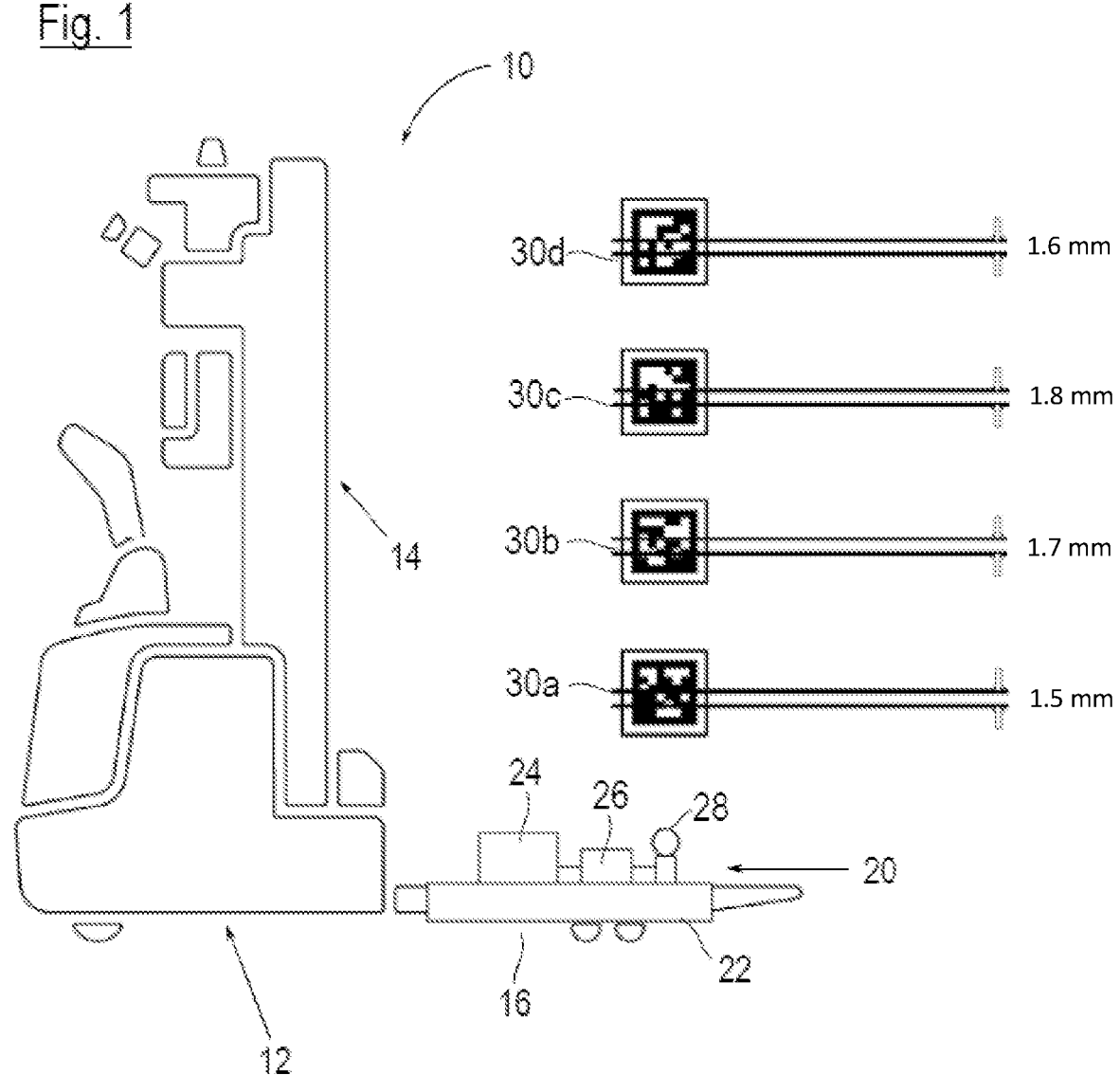

This application claims priority to German Patent Application No. 10 2021 104 920.2, filed in Germany on Mar. 2, 2021, the entire contents of which are hereby incorporated herein by this reference.

The present invention relates generally to improvements in methods for calibrating coordinate systems in industrial trucks, in particular automated industrial trucks.

In general, automated industrial trucks comprise a large number of sensors in order to be able to navigate autonomously within a predetermined framework in a logistics facility. In order to ensure that, for each vehicle, given positions in such facilities can be approached reproducibly with sufficient precision, it is necessary to calibrate the coordinate systems used internally by the vehicles for their navigation.

Carrying out such calibration processes individually and manually for individual vehicles is known from the prior art. In practice, this means that the corresponding vehicles automatically navigate to a predetermined point in the facility and the deviation of the spatial position actually reached by the vehicle from the desired spatial position is measured manually by an operator. This deviation is then stored as an offset or correction variable in the control unit of the corresponding vehicle as a correction of the internal coordinate system and this process is repeated iteratively until a predetermined desired precision for the corresponding vehicle in such processes has been achieved.

However, this shows that calibration processes carried out manually in this way are relatively time-consuming and require a large number of appropriately trained personnel, since a precise measurement of a distance between an expected and an actual position and subsequent input of the corresponding data is needed several times. Input, measurement and/or operating errors can of course occur here, which can lead to further inefficiencies during the calibration process.

The object of the present invention is therefore that of achieving an increased degree of automation in such calibration processes and thus establishing more efficient and less error-prone procedures in methods for calibrating coordinate systems of automated industrial trucks.

For this purpose, according to a first aspect of the present invention, a method for calibrating a coordinate system of an automated industrial truck comprises the steps of: providing an uncalibrated coordinate system for the industrial truck; providing the industrial truck with a visual marker at a predetermined position and positioning an optical camera at a predetermined camera position outside the industrial truck or attaching a visual marker to a predetermined fixed spatial position outside the industrial truck and positioning an optical camera at a predetermined camera position on the industrial truck; the industrial truck performing a predetermined sequence of movements in order to arrive at a desired spatial target state via a desired trajectory, on the basis of the uncalibrated coordinate system; recording the visual marker on the industrial truck by means of the optical camera which is remote from the industrial truck or recording the visual marker arranged outside the industrial truck by means of the optical camera which is arranged on the industrial truck in order to determine the actual trajectory and/or the actual spatial state of the industrial truck; comparing the determined spatial state of the industrial truck with the desired spatial state and/or the determined trajectory with the desired trajectory; and calibrating the coordinate system of the industrial truck on the basis of the result of this comparison.

By thus measuring, in an automated manner according to the invention by means of a visual marker, a movement vector of the industrial truck or at least one movable component thereof through the space and/or at least one point in space in the form of the desired spatial target state automatically by means of an optical camera and automatically further processing the data obtained in this way for calibration of the coordinate system of the industrial truck, manual measurement processes for calibrating the corresponding coordinate system are superfluous, as a result of which an increase in the efficiency of the method is achieved and possible operator errors are excluded from the outset.

Here, the desired trajectory can extend from a starting point to a desired target point via a substantially freely definable path; however, the trajectory could also be defined solely by a target position such that the corresponding industrial truck, on the basis of its capability for automated operation, can calculate the shortest possible path to this target position, for example, and then travel said path. In any case, the industrial truck to be calibrated then travels the corresponding trajectory autonomously on the basis of the currently used coordinate system, and the vectorial course of the visual marker through the space or the end position is recorded as the target state by means of the at least one optical camera and then evaluated.

In this context, it goes without saying that a plurality of cameras can also be used, for example to simultaneously record a plurality of optical markers on a single industrial truck or to be able to obtain additional information with regard to further degrees of freedom, such as depth information which can be difficult to derive using a single camera or also information regarding degrees of freedom of rotation or a lateral position in two dimensions.

Furthermore, the use of a plurality of optical cameras offers the possibility of following a trajectory of the optical marker over a larger area. Ultimately, however, the type of the at least one camera used only has to be matched to the at least one visual marker and the data to be derived by means of the method, and it is therefore conceivable, for example, to use 3D cameras, for example with TOF (time of flight) sensors, or even infra-red cameras, provided that the optical markers can be recorded by these cameras with the desired precision. However, the advantage of using visual markers located in the visible range and working cameras is always that all sequences can be more easily traced and monitored by human operators.

It should also be noted that the method according to the invention not only allows calibration of coordinate systems stored locally on industrial trucks, but corresponding correction data or offsets can also be saved or stored on an external entity, for example on a central administrative unit. In such embodiments, different industrial trucks can then obtain, in accordance with their respective correction data, different coordinates for approaching the same location within the framework of control instructions from the central administrative unit.

To further improve the precision of the method according to the invention, this method can also comprise: the industrial truck successively approaching a plurality of desired spatial target states or approaching the same spatial target state multiple times; determining in each case the actual spatial state of the industrial truck by means of the optical camera; comparing in each case the determined actual spatial target state of the industrial truck with the desired spatial target state; and calibrating the coordinate system of the industrial truck on the basis of the results of the comparisons.

In this way, a plurality of independent data sets can be recorded to improve the calibration result, which sets can be used either in an iterative way for calibration on the basis of each of the successive comparisons and/or optionally weighted averaging between each of the successive comparisons in order to calibrate the coordinate system of the corresponding vehicle.

Here, the number of desired spatial target states or repetitions of approaching the same spatial target state multiple times can either be specified in advance or, for example, be carried out iteratively until there is no longer significant improvement in the calibration result or the amounts of the correction factors between two successive iterative steps fall below a threshold.

In a practical application which is particularly suitable for the method according to the invention according to the first aspect, the predetermined sequence of movements can relate to a vertical movement of the lift element on a lift mast of the industrial truck and the desired spatial target state can relate to a desired height position of the lift element. In this application example, either the visual marker or the optical camera could be assigned to the lift element, while the respective other component of the marker and the camera would accordingly be attached to a predetermined position on a vertical structure provided for this purpose, such as a wall or a pillar.

Here, a plurality of markers and/or a plurality of cameras can be used to improve the calibration result, for example a single camera carried by the lift element and a plurality of visual markers attached to predetermined positions vertically one above the other; alternatively or additionally, however, the method can also comprise carrying out said method multiple times with different loads carried by the lift element in order to ensure that the calibrated coordinate system or a characteristic map which comprises the load carried by the lift element as a further variable functions reliably even in different work scenarios of the industrial truck that occur in practice, and can be evaluated, for example, by means of consulting data recorded by corresponding sensors regarding the load carried.

According to a second aspect, the present invention relates to a method for calibrating each coordinate system of a fleet of automated industrial trucks having uncalibrated coordinate systems, comprising the steps of: defining a master vehicle from the fleet; providing the master vehicle and all further vehicles in the fleet with at least one visual marker on the vehicles; carrying out a calibration of the coordinate system of the master vehicle; the calibrated master vehicle performing a predetermined sequence of movements in order to arrive at a calibrated spatial target state via a calibrated trajectory; recording the at least one visual marker on the master vehicle by means of an optical camera which is remote from the master vehicle in order to determine a master trajectory and/or a master target state; and, for each of the further vehicles in the fleet: performing a predetermined sequence of movements on the basis of the corresponding uncalibrated coordinate system in order to simulate the master trajectory and/or to reach the master target state; recording the at least one visual marker on the further vehicle by means of an optical camera in order to determine the actual trajectory and/or the actual spatial state of the vehicle; comparing the determined actual spatial state of the vehicle with the master target state and/or the actual trajectory with the master trajectory; and calibrating the coordinate system of the vehicle on the basis of the result of this comparison.

The method according to the second aspect of the present invention involves calibrating a master vehicle in a basically arbitrary manner, for example also in accordance with the prior art described at the beginning, such that said master vehicle can initially approach a predetermined spatial target point as a calibrated spatial state. Since, analogously to the first aspect of the present invention, all vehicles in the fleet are provided with at least one visual marker, the master vehicle can first of all perform a predetermined sequence of movements and while doing so be captured by the at least one optical camera. Since the further vehicles in the fleet now also reach the predetermined spatial target state via a corresponding predetermined sequence of movements, the deviation between the at least one visual marker of each vehicle to be calibrated and the corresponding marker of the master vehicle can be compared.

In this way, each coordinate system can then be automatically calibrated for each of the further vehicles in the fleet on the basis of the results of these comparisons such that, according to the method according to the invention, it is only necessary to individually calibrate the master vehicle, while all further vehicles in the fleet can be automatically calibrated via the specified calibrated trajectory or the calibrated spatial target state of the master vehicle.

In this case, at least some of the vehicles in the fleet can be of the same vehicle type and the visual markers can be provided at identical positions thereon. In this context, the term "identical vehicle type" refers to the fact that the functional components of the individual vehicles, by means of which components the work processes that require calibration are ultimately to be carried out, are substantially designed in the same way. For example, vehicles of an identical vehicle type within the meaning of the present invention, of which the drive systems are to be calibrated, can have different lift devices, while vehicles of which the lift devices are to be calibrated have different drive systems.

The method according to the invention just described can also be used with any vehicle types within a fleet, as long as the data required for the calibration of the corresponding components that are required to carry out the relevant work processes can be derived by means of the at least one marker and can be set in relation to the corresponding marker of the master vehicle. In a simple example in which it would only be necessary to move each of the load forks of otherwise differently constructed vehicles to a predetermined position and thus calibrate them, the corresponding marker on the load fork could thus be provided for calibration, while other components of the corresponding vehicles are not taken into account.

Ultimately, the corresponding marker could even no longer be assigned to the component in question, but instead offsets between known marker positions and relevant components could be stored for vehicles of different types and taken into account in the actual calibration. An illustrative example of this is charging coils in electrically operated industrial trucks to be charged inductively, the positions of which coils in the vehicle body can differ from one another in different vehicle types, but are always exactly known. Placing the known position of such a charging coil in a geometric relationship to a position of a marker on the vehicle can ensure that, after a calibration has been carried out according to the present invention, it is always possible to correctly reach a charging position after calibration, even for different vehicle types.

The above-mentioned techniques can of course be combined with one another such that the position of the at least one marker, from which the position of the charging coil can be derived, can be assigned to a load fork, for example in the above-mentioned manner, such that both the load fork as a component for receiving loads as well as the charging coil of different vehicle types in a fleet could be calibrated by means of only one suitable marker in the region of the load forks.

The position of the at least one optical camera for the master vehicle and all of the further vehicles in the fleet can be identical, but in principle it is also possible for the position(s) of the at least one camera to change between the calibration processes of the individual vehicles. In this case, in particular, it can accordingly be advantageous if calibrating the further vehicles in the fleet comprises calculating a correction vector such that the calibration of the coordinate system can take place on the basis of a camera coordinate system by means of which a global coordinate system is defined. For this purpose, further static visual markers can be arranged in the space in which the calibration process takes place such that when the camera position is changed, the camera coordinate system can first be established on the basis of the detection of these static visual markers, from which conclusions can then be drawn about the global coordinate system.

In any case, each calibration of the coordinate system of the further vehicles in the fleet can comprise performing a predetermined sequence of movements multiple times and recording the at least one visual marker multiple times as well as iterative calibration on the basis of each of the successive comparisons and/or optionally weighted averaging between each of the successive comparisons.

This can involve performing the same predetermined sequence of movements multiple times or different sequences of movements to the same intended target position or to different target positions, it only being necessary to ensure that corresponding master trajectories or master target states have already been recorded in advance. In analogy to the description above, performing a predetermined sequence of movements can also only be defined by its end point, in which case, for example, the corresponding industrial truck in the fleet can calculate and perform its own route to this end point from any starting point and consequently the at least one visual marker is recorded by means of the optical camera solely on the basis of this target state, as a result of which the calibration is then possible.

In principle, the calibration of the coordinate system of the master vehicle can be carried out by means of a method according to the first aspect of the present invention; alternatively, however, calibration of the coordinate system of the master vehicle also comprises approaching the spatial target state on the basis of the uncalibrated coordinate system thereof as well as measuring the actually reached target state and comparing the actually reached target state with the desired spatial target state in a manner which is carried out at least partly manually by an operator. Thus, different degrees of automation are conceivable for the calibration of the coordinate system of the master vehicle; both the highly integrated and automated calibration according to the method of the first aspect of the present invention and also a manual calibration by an operator as known from the prior art and as described above can be used. In any case, there are practically no limits to the precision of the calibration of the master vehicle, since possibly limiting factors such as the resolution of the camera, the accuracy of the image evaluation and the reproducible attachment of the visual markers to the vehicles can be carried out with an accuracy that significantly exceeds the requirements for the calibration accuracy of the coordinate systems of the vehicle.

Furthermore, the calibration of the master vehicle and in principle also the further vehicles in the fleet can also comprise a so-called virtual calibration, wherein calibration of the coordinate system of the master vehicle can comprise comparing properties of components of the master vehicle with calibrated reference components and/or wherein calibration of the coordinate systems of the further vehicles in the fleet can comprise comparing properties of components of the corresponding vehicle with master components of the master vehicle. This additional calibration step can be combined in many ways with the further steps described above and can in particular be carried out before or during the assembly of the corresponding vehicle, in order to carry out a pre-calibration of the corresponding vehicle before it is delivered, if it is known how and to what extent, for example, manufacturing tolerances in individual components of the corresponding vehicle ultimately affect its operating properties.

Finally, the present invention relates to a system for carrying out a method according to the first or the second aspect of the present invention, comprising: at least one optical camera; an image processing unit which is operatively coupled to the at least one optical camera and is designed to recognize visual markers and to determine their spatial position; and a computing unit which is operatively coupled to the image processing unit and is designed to perform a calibration of a coordinate system of an industrial truck on the basis of a comparison of a determined spatial position and a desired spatial position.

Here, the system according to the invention can further comprise a communication unit which is designed to communicate with a corresponding communication unit of an industrial truck. For example, a set of correction factors for an uncalibrated coordinate system of the vehicle or also a completely calibrated coordinate system can be transferred directly to the industrial truck via the communication channel formed in this way.

Furthermore, the system according to the invention can comprise an administrative unit which is designed to output instructions regarding predetermined sequences of movements and/or predetermined target states to an industrial truck and to communicate with said industrial truck by means of the communication unit. Thus, by providing the administrative unit, an operating plan for the individual calibration processes can be transferred step by step to the individual industrial trucks in a coordinated manner.

Figure 2:
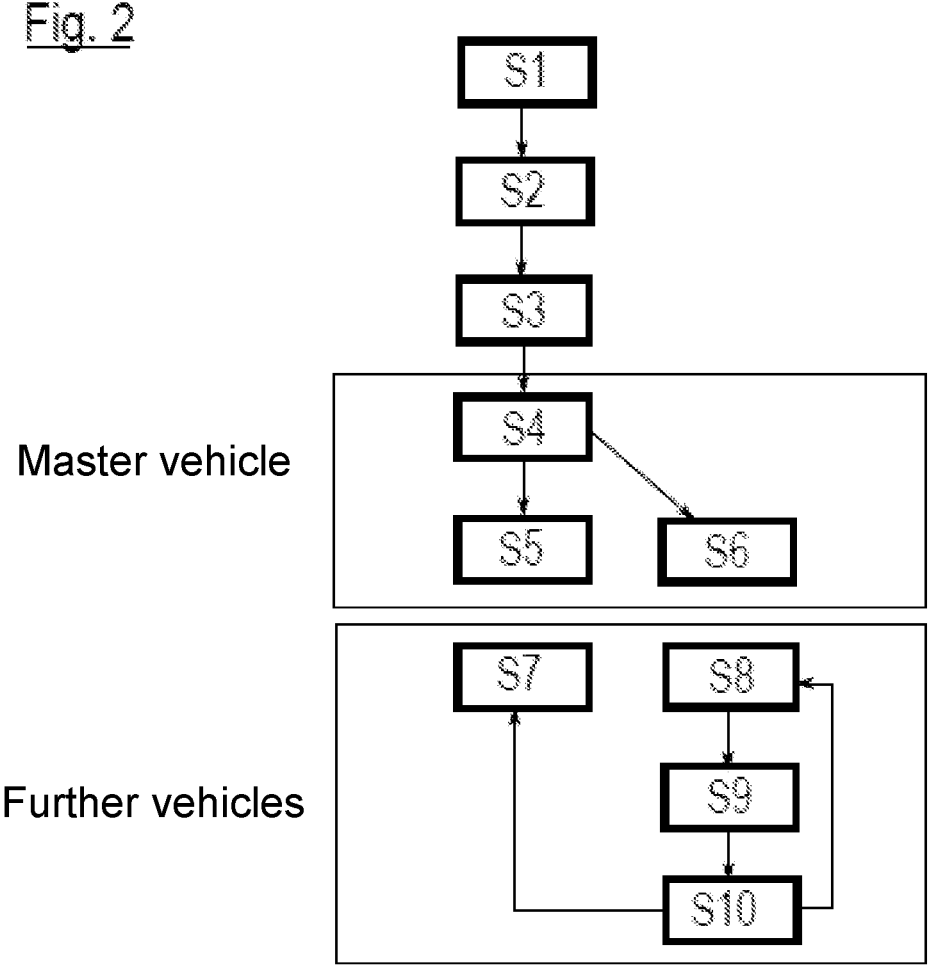
Figure 3:
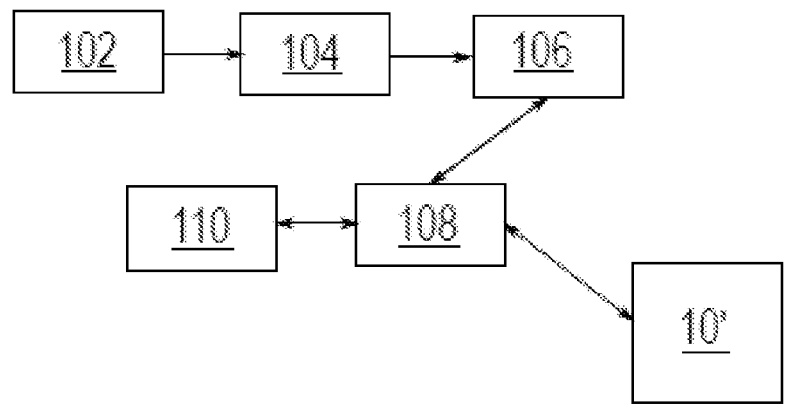

Further features and advantages of the present invention will become clear from the following description of embodiments thereof when this is considered together with the accompanying drawings. In detail, in the drawings:

FIG. 1: shows a schematic representation of an automated industrial truck when a calibration method is being carried out;

FIG. 2: shows a schematic view of a method sequence of a calibration method of a second embodiment; and FIG. 3: shows a schematic representation of a system according to the invention for carrying out such calibration methods.

In FIG. 1, an automated industrial truck 10 is initially shown schematically when a calibration method is being carried out. This industrial truck 10 comprises a vehicle body 12 and a lift mast 14 on which a lift element 16 is supported so as to be vertically displaceable.

In the embodiment shown, the lift element 16 carries a camera assembly 20 for calibrating the internal coordinate system 10 on a pallet 22 which is suitable and adapted for this purpose, wherein the camera arrangement 20 further comprises an energy store 24, a data processing unit 26 and the actual camera 28. Here, the spatial alignment of the camera 28 with respect to the lift element 16 is determined by the assembly on the pallet 20, as a result of which the relative position of the camera 28 to the vehicle body 12 can also be derived by evaluating data detected by suitable sensors of the industrial truck 10 for determining the current lift height of the lift element 16.

Furthermore, a total of four visual markers 30a to 30d are indicated in FIG. 1, which markers are attached to a vertical structure such as a wall or to a pillar at different heights at precisely defined positions.

In order to now calibrate the internal coordinate system of the industrial truck 10 with regard to vertical movements of the lift element 16, the industrial truck 10 first moves to a suitable position from which the camera 28 can detect each of the markers 30a to 30d individually when the lift element 16 is arranged in a suitable vertical position.

Since, in the embodiment shown, these markers 30a to 30d are designed as AprilTags3, they are particularly suitable for automated optical detection and for subsequent further data processing by means of the data processing unit 26. However, the use of other types of markers or tags would also be conceivable at this point, for example QR codes.

After the industrial truck 10 has reached the appropriate position, the lift element 16 of the industrial truck 10 is raised to a height which, according to the internal coordinate system of the industrial truck, corresponds to a predetermined alignment of the camera 28 to one of the visual markers 30a to 30d. After an image has been recorded by the camera 28 from this predicted position, a deviation between the position expected for the camera 28 and the position actually determined by processing the camera data recorded thereby can then be calculated by the data processing unit 26.

In the example shown here, such a determination is carried out sequentially for each of the visual markers 30a to 30d, with deviations in the order of magnitude of 1.5 to 1.8 millimeters resulting in each case. On the basis of these determined deviations, the internal coordinate system of the industrial truck 10 can then be calibrated, and further iterations of this process can be carried out to further improve the precision of the coordinate system or to verify it. Furthermore, it is advisable to carry out such a method multiple times in succession with a different load carried by the lift element 16, either only to verify the calibration or to calibrate a higher-dimensional characteristic map which also comprises the carried load as a further dimension in addition to the vertical spatial position. Alternatively, a functional dependency on the load carried can also be calibrated.

The method just described can carry out a calibration of one or more industrial trucks with minimal operator effort since, depending on the capability of the industrial truck 10 for automated operation, some or all of the steps described can be carried out autonomously by the vehicle 10, such as approaching the suitable position in front of the vertical object which carries the markers 30a to 30d. In a variant of the embodiment shown here, one or more stationary cameras could also be provided, in which case the corresponding at least one visual marker would then be assigned to the lift element of the industrial truck.

FIG. 2 now shows, in the form of a flow chart, a schematic view of a method sequence of a calibration method of a second embodiment of the present invention, in which a fleet of automated industrial trucks of the same vehicle type is initially provided in a step S1, the internal coordinate systems of which trucks have not yet been sufficiently calibrated so that the industrial trucks could already be working in productive operation.

Although a fleet of vehicles of the same type is calibrated in the method explained here in connection with FIG. 2, the corresponding vehicles could also be different in variants thereof, as long as the data required for the calibration of the components relevant to corresponding operations can be clearly derived from the markers.

A single master vehicle is then selected from the fleet of automated industrial trucks in step S2. At least one visual marker is then attached to the master vehicle as well as to all further vehicles in the fleet at identical positions on each vehicle in the context of a step S3; the steps S2 and S3 can of course also be carried out chronologically reversed.

Assuming that both the master vehicle and all further vehicles in the fleet are now marked in the same way, a calibration of the internal coordinate system of the master vehicle is now carried out in step S4, for example completely or partly manually by an operator or by means of an automated method within the context of the technologies presented here.

The master vehicle calibrated in this way now performs a predetermined sequence of movements in the context of step S5 in order to arrive at a calibrated spatial target state via a calibrated trajectory, and at the same time in step S6 this sequence of movements and in particular the visual marker on the master vehicle is recorded by means of an optical camera which is remote from the master vehicle and a master trajectory and/or a master target state is determined from this by means of suitable data processing.

One of the further vehicles in the fleet then performs a predetermined sequence of movements in an uncalibrated state in order to simulate the master trajectory and/or reach the master target state (step S7). At the same time, in step S8, the at least one visual marker on the further vehicle is recorded again by means of an optical camera in order to determine the actual trajectory of the corresponding vehicle and/or the actual spatial state of the vehicle.

Then, in step S9, the determined actual spatial state of the corresponding vehicle is compared with the master target state and/or the actual trajectory of the vehicle is compared with the master trajectory, and then in step S10 the coordinate system of the further vehicle is calibrated on the basis of the result of the comparison from step S9.

After the calibration of the corresponding vehicle has been completed in step S10, which calibration can comprise, for example, carrying out steps S7 to S10 multiple times for iterative improvement of the calibration of the vehicle or for mean value formation, steps S7 to S10 are performed in an analogous manner one after the other for all the further vehicles in the fleet in order to finally have calibrated the entire fleet, although only the master vehicle has to be calibrated in a different way compared to the rest of the vehicles in the fleet, and therefore the increased degree of automation means that considerably less effort has to be made than would have been necessary if all vehicles in the fleet had to be calibrated manually.

Finally, FIG. 3 shows a system for carrying out such a method in a schematic representation, which system is indicated quite generally with the reference sign 100, wherein the system can be configured at least partly by corresponding components from FIG. 1.

This system 100 comprises at least one optical camera 102, as well as an image processing unit 104 which is operatively coupled to the at least one optical camera 102 and is designed to determine the visual markers mentioned in the context of FIG. 1 and FIG. 2 on an industrial truck or at a predetermined position in the surroundings of the industrial truck. This image processing unit 104 is, for its part, operatively coupled to a computing unit 106 which is designed to perform a calibration of the coordinate system of an industrial truck 10' on the basis of a comparison of the determined spatial position of the corresponding visual marker with a desired spatial position. In this case, the system 100 can further comprise a communication unit 108 for communication with the industrial truck 10' as well as an administrative unit 110 which is designed to output instructions regarding predetermined sequences of movements and/or predetermined target states to the industrial truck 10' and to communicate with said industrial truck by means of the communication unit 108.

As can be seen from FIGS. 1 and 2 and the calibration methods presented therein, the system from FIG. 3 can be completely or partly assigned to the industrial truck 10', in particular in embodiments which are similar to those from FIG. 1, while all of the components of the system 100 can also be provided remotely from the industrial truck 10' in embodiments for carrying out a method according to FIG. 2.

The invention claimed is:

1. A method for calibrating a coordinate system of an industrial truck, comprising:
    providing an uncalibrated coordinate system for the industrial truck;
    either (i) providing the industrial truck with a visual marker at a predetermined position and positioning an optical camera at a predetermined camera position outside the industrial truck, or (ii) attaching the visual marker to a predetermined fixed spatial position outside the industrial truck and positioning the optical camera at a predetermined camera position on the industrial truck;
    wherein the industrial truck performs a predetermined sequence of movements in order to arrive at a desired spatial target state via a desired trajectory based on the uncalibrated coordinate system;
    recording the visual marker on the industrial truck by means of the optical camera which is remote from the industrial truck or recording the visual marker arranged outside the industrial truck by means of the optical camera which is arranged on the industrial truck, in order to determine an actual trajectory and/or an actual spatial state of the industrial truck;
    comparing the determined actual spatial state of the industrial truck with the desired spatial target state and/or the determined actual trajectory with the desired trajectory; and
    calibrating the coordinate system of the industrial truck based on a result of the comparison.

2. The method according to claim 1, further comprising:
    causing the industrial truck to successively approach a plurality of desired spatial target states or to approach a same spatial target state multiple times;
    determining in each case the actual spatial state of the industrial truck by means of the optical camera;
    comparing in each case the determined actual spatial state of the industrial truck with the desired spatial target state; and
    calibrating the coordinate system of the industrial truck based on results of the comparisons.

3. The method according to claim 2, wherein calibrating the coordinate system comprises iterative calibration based on each of the comparisons.

4. The method according to claim 2, wherein calibrating the coordinate system comprises iterative calibration based on weighted averaging between each of the comparisons.

5. The method according to claim 1, wherein the predetermined sequence of movements relates to a vertical movement of a lift element on a lift mast of the industrial truck and the desired spatial target state relates to a desired height position of the lift element.

6. The method according to claim 5, further comprising carrying out the method multiple times with different loads carried by the lift element.

7. The method according to claim 1, wherein the predetermined camera position outside the industrial truck comprises the predetermined fixed spatial position outside the industrial truck.

8. A method for calibrating each coordinate system of a fleet of automated industrial trucks having uncalibrated coordinate systems, comprising:
    defining a master vehicle from the fleet;
    providing the master vehicle and all further vehicles in the fleet with at least one visual marker on the vehicles;
    carrying out a calibration of a coordinate system of the master vehicle
    wherein a calibrated master vehicle is configured for performing a predetermined sequence of movements in order to arrive at a calibrated spatial target state via a calibrated trajectory;
    recording the at least one visual marker on the master vehicle by means of an optical camera which is remote from the master vehicle in order to determine at least one of a master trajectory or a master target state of the master vehicle; and
    for each of the further vehicles in the fleet:
        performing the predetermined sequence of movements based on a corresponding uncalibrated coordinate system in order to simulate the master trajectory and/or reach the master target state;
        recording the at least one visual marker on the further vehicle by means of the optical camera in order to determine at least one of an actual trajectory or an actual spatial state of the further vehicle;
        comparing at least one of: (i) the determined actual spatial state of the further vehicle with the master target state or, (ii) the actual trajectory with the master trajectory; and
        calibrating the coordinate system of the further vehicle based on a result of the comparison.

9. The method according to claim 8, wherein at least some of the vehicles in the fleet are of a same vehicle type and visual markers are provided at identical positions thereon.

10. The method according to claim 8, wherein calibrating the further vehicles in the fleet comprises calculating a correction vector.

11. The method according to claim 8, wherein calibrating each coordinate system of the further vehicles in the fleet comprises performing the predetermined sequence of movements multiple times and recording the at least one visual marker multiple times as well as performing an iterative calibration based on comparison.

12. The method according to claim 8, wherein calibrating the coordinate system of the master vehicle comprises:
- providing an uncalibrated coordinate system for the master vehicle;
- either (i) providing the master vehicle with a visual marker at a predetermined position and positioning an optical camera at a predetermined camera position outside the master vehicle, or (ii) attaching the visual marker to a predetermined fixed spatial position outside the master vehicle and positioning the optical camera at a predetermined camera position on the master vehicle;
- causing the master vehicle to perform the predetermined sequence of movements in order to arrive at a desired spatial target state via a desired trajectory based on the uncalibrated coordinate system;
- recording the visual marker on the master vehicle by means of the optical camera which is remote from the master vehicle or recording the visual marker arranged outside the master vehicle by means of the optical camera which is arranged on the master vehicle, in order to determine an actual trajectory and/or an actual spatial state of the master vehicle;
- comparing the determined actual spatial state of the master vehicle with the desired spatial target state and/or the determined actual trajectory with the desired trajectory; and
- calibrating the coordinate system of the master vehicle based on a result of the comparison of the determined actual spatial state of the master vehicle with the desired spatial target state and/or the determined actual trajectory with the desired trajectory.

13. The method according to claim 8, wherein calibrating the coordinate system of the master vehicle comprises travelling to a desired spatial target state based on the uncalibrated coordinate system as well as measuring an actually reached target state, and comparing the actually reached target state with the desired spatial target state.

14. The method according to claim 8, wherein calibrating the coordinate system of the master vehicle comprises comparing properties of components of the master vehicle with calibrated reference components.

15. The method according to claim 8, wherein calibrating each coordinate system of the further vehicles in the fleet comprises performing the predetermined sequence of movements multiple times and recording the at least one visual marker multiple times as well as performing an iterative calibration based on weighted averaging between each comparison.

16. The method according to claim 8, wherein calibrating the coordinate systems of the further vehicles in the fleet comprises comparing properties of components of a corresponding vehicle with master components of the master vehicle.

17. A system for calibrating a coordinate system of an industrial truck, comprising:
- at least one optical camera configured to record a visual marker on or outside of the industrial truck;
- an image processing unit which is operatively coupled to the at least one optical camera and is designed to recognize the visual marker and to determine an actual spatial position of the industrial truck; and
- a computing unit which is operatively coupled to the image processing unit and is configured to execute instructions, wherein the industrial truck performs a predetermined sequence of movements in order to arrive at a desired spatial position based on an uncalibrated coordinate system, for:
- comparing the determined actual spatial position of the industrial truck with the desired spatial position; and
- calibrating the coordinate system of the industrial truck based on the comparison of the determined actual spatial position and the desired spatial position.

18. The system according to claim 17, further comprising a communication unit which is designed to communicate with a corresponding communication unit of the industrial truck.

19. The system according to claim 18, further comprising an administrative unit which is designed to output instructions regarding at least one of predetermined sequences or predetermined target states to the industrial truck and to communicate with the industrial truck by means of a communication unit.

* * * * *